United States Patent
Ohnishi

(10) Patent No.: US 10,792,937 B2
(45) Date of Patent: Oct. 6, 2020

(54) PRINTING APPARATUS AND PRINTING METHOD

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 16/255,844

(22) Filed: Jan. 24, 2019

(65) Prior Publication Data

US 2019/0232684 A1 Aug. 1, 2019

(30) Foreign Application Priority Data

Jan. 30, 2018 (JP) ................................ 2018-013679

(51) Int. Cl.
*B41J 11/00* (2006.01)
*C09D 11/101* (2014.01)
(Continued)

(52) U.S. Cl.
CPC ......... *B41J 11/002* (2013.01); *B41J 2/14104* (2013.01); *B41M 7/0081* (2013.01); *C09D 11/101* (2013.01); *C09D 11/30* (2013.01)

(58) Field of Classification Search
CPC .... B41J 2/14104; B41J 2/2107; B41J 11/002; B41J 11/0015; B41M 7/0081; C09D 11/101

See application file for complete search history.

(56) References Cited

U.S. PATENT DOCUMENTS

| 2003/0064206 A1* | 4/2003 | Koyano | B41M 5/0017 428/195.1 |
| 2008/0192100 A1* | 8/2008 | Nakajima | B41J 2/2107 347/102 |

(Continued)

FOREIGN PATENT DOCUMENTS

| CN | 105026493 | 11/2015 |
| EP | 3124261 | 2/2017 |
| WO | 2017135425 | 8/2017 |

OTHER PUBLICATIONS

English Translation of WO 2017/135425 A1 Originally Published Aug. 10, 2017, Downloaded from ip.com Feb. 12, 2020. (Year: 2017).*

(Continued)

*Primary Examiner* — John Zimmermann
(74) *Attorney, Agent, or Firm* — JCIPRNET

(57) ABSTRACT

To perform high-quality printing more appropriately, a printing apparatus (10) configured to print on a medium (50) by inkjet includes: an inkjet head (102); and a UV light source (104) as an energy ray emitting unit. The UV light source (104) emits the ultraviolet rays to the ink adhered to the medium (50), causing the ink to generate heat to evaporate at least a part of a solvent in the ink. The ink ejected by the inkjet head (102) includes a polymerizing substance that polymerizes when irradiated with the energy rays, and the solvent. The ink on the medium (50) is in a state in which planarization of the ink progresses with a lapse of time at a time point after 100 ms has elapsed since the UV light source (104) emitted the ultraviolet rays.

13 Claims, 3 Drawing Sheets

(51) Int. Cl.
*C09D 11/30* (2014.01)
*B41J 2/14* (2006.01)
*B41M 7/00* (2006.01)

(56) References Cited

U.S. PATENT DOCUMENTS

2008/0225100 A1* 9/2008 Kumagai .................. B41J 2/15
  347/102
2009/0085256 A1  4/2009 Mataki
2015/0321488 A1* 11/2015 Ohnishi .................... B41J 2/15
  347/102
2016/0312050 A1* 10/2016 Ohnishi ............... B41M 7/0081

OTHER PUBLICATIONS

"Search report of Europe Counterpart Application," dated May 29, 2019, p. 1-p. 7.
"Office Action of China Counterpart Application", dated May 7, 2020, with English translation thereof, p. 1-p. 20.

* cited by examiner

PRINTING APPARATUS AND PRINTING METHOD

CROSS REFERENCE TO RELATED APPLICATIONS

This application claims the priority of Japan patent application serial no. JP2018-013679, filed on Jan. 30, 2018. The entirety of the above-mentioned patent application is hereby incorporated by reference herein and made a part of this specification.

BACKGROUND OF THE INVENTION

Technical Field

The present disclosure relates to a printing apparatus and a printing method.

Background Art

Conventionally, printing apparatuses (inkjet printers) configured to print with inkjet are widely used. In recent years, in regard to a method of printing with inkjet printers, it has been proposed to use fast-drying ink, which instantaneously dries when irradiated with energy rays such as ultraviolet rays (UV light) (see, for example, Patent Literature 1). In this case, for example, a UVLED is used to emit ultraviolet rays to evaporation-drying ink, which is fixed to a medium by evaporating the medium, to convert the ultraviolet rays into thermal energy so that the ink can be instantaneously dried and fixed.

Patent Literature 1: International Application Publication No. 2017/135425

SUMMARY

The use of a fast-drying ink can appropriately prevent the ink from bleeding by instantaneously drying the ink. This enables high-definition printing to be performed on media with which a severe problem of bleeding would be involved if used with conventional evaporation-drying ink (for example, conventional solvent ink, aqueous ink, latex ink, and other emulsion ink). However, the fast-drying ink is still a new technology. Thus, a more preferred ink configuration and a more preferred ink drying method have been sought for the fast-drying ink. It is therefore an object of the present disclosure to provide a printing apparatus and a printing method that can solve the above-mentioned problem.

The inventors of the present disclosure conducted diligent studies on various features of a case where the fast-drying ink is used. Through the diligent studies, the inventors of the present disclosure found that the use of the fast-drying ink may cause a new problem when the ink is dried in an extremely short period of time. More specifically, in the case where printing is performed by using the fast-drying ink, for example, an occurrence of bleeding can be suppressed by emitting energy rays (such as ultraviolet rays) immediately after the ink is landed on a medium. In this case, however, instantaneous heating of the ink may cause the ink to be dried without being sufficiently planarized, and this makes a surface of the ink matte. In this case, if an amount of the emitted energy rays is large, the ink may cause an explosive boiling phenomenon. In this case, the surface of the ink may become porous to make it difficult to perform high-glossy printing. Because the surface of the ink becomes coarse, the quality (image quality) of printing may reduce.

To prevent the surface of the ink from coarsening as a result of being matte or porous, for example, it is conceivable to emit ultraviolet rays having small light amount so as to dry the ink slowly. In this case, however, the ink may easily bleed, and the effect of using the fast-drying ink is not sufficiently obtained in some cases. For example, the use of ink containing pigment as colorant may cause a coffee stain phenomenon in which the pigment becomes unbalanced until the ink is dried. More specifically, for example, in the case where ink containing pigment is used to print on a non-permeable medium (for example, a glossy medium) such as a plastic film having a small contact angle, if ink is dried slowly under emission conditions of ultraviolet rays with relatively small light amount, particles of the pigment as the colorant are more likely concentrated on the circumference of dots of ink and the circumference of a printed image where drying speed is higher than that in other regions in the process of drying, thus easily causing the coffee stain phenomenon. As a result, a problem of reduced image quality occurs due to reduced average density of the image. If the emission light amount of ultraviolet rays is increased to reduce the coffee stain phenomenon, the surface of the ink becomes coarse as described above to reduce the image quality.

In view of the above, the inventors of the present disclosure conceived the idea of using ink containing a substance that polymerizes slowly to function as a binder resin, instead of simply drying the ink instantaneously. The inventors of the present disclosure found that the use of the ink configured as above can appropriately prevent the occurrence of the problems of the coarsening and the coffee stain phenomenon described above while suppressing the occurrence of bleeding. Through additional diligent studies, the inventors of the present disclosures found features necessary for obtaining such effects and arrived at the present disclosure.

In order to solve the above-mentioned problems, the present disclosure provides a printing apparatus configured to print on a medium by inkjet, including: an inkjet head, configured to eject ink to the medium; and an energy ray emitting unit, configured to emit energy rays to the ink adhered to the medium. The energy ray emitting unit emits the energy rays to the ink adhered to the medium to cause the ink to generate heat such that at least part of the solvent in the ink is evaporated. The ink ejected from the inkjet head includes: a polymerizable substance that polymerizes when irradiated with the energy rays, and a solvent. The ink on the medium is in a state in which planarization of the ink progresses with lapse of time at a time point after 100 ms has elapsed since the energy ray emitting unit emitted the energy rays.

With such a configuration, for example, the energy rays are emitted to cause the ink itself to generate heat and hence the ink can be heated efficiently and appropriately. Consequently, for example, at least part of the solvent in the ink can be evaporated to increase a viscosity of the ink appropriately to a viscosity that causes no bleeding. Thus, this configuration can appropriately prevent the bleeding of the ink from occurring, for example. In this case, by increasing the viscosity of the ink to a viscosity that causes no bleeding, for example, the coffee stain phenomenon can be appropriately prevented even when pigment is used as colorant.

In this configuration, for example, it is preferred to use ultraviolet rays as energy rays. In this case, the polymerizable substance can be considered as a substance that polymerizes when irradiated with ultraviolet rays. This configuration can efficiently and appropriately heat the ink. In this configuration, for example, the polymerizable substance can also be considered as a substance that takes a certain period of time to raise its viscosity to high levels after the energy rays are emitted. The polymerizable substance functions, for example, as a binder resin of the ink due to polymerization. In this case, the binder resin can be appropriately and sufficiently planarized before the polymerization of the polymerizable substance progresses to increase the viscosity of the ink. Thus, for example, even when the surface of the ink becomes temporarily coarse due to the fact that the solvent is instantaneously evaporated by the emission of the energy rays, the surface of the ink can thereafter be planarized (smoothed) appropriately. Consequently, for example, this configuration enables high-quality printing to be performed more appropriately in the case where fast-drying ink is used.

In this configuration, the energy ray emitting unit emits energy rays to the ink adhered to the medium, thereby causing the ink to generate heat to a temperature at which the solvent in the ink boils, for example. In this case, the situation where the solvent in the ink boils means, for example, that the temperature of the solvent reaches a boiling point in at least a part of the period before the ink is fixed to the medium. For example, this configuration enables ink to be more appropriately heated to high temperature. Consequently, at least part of the solvent in the ink can be more appropriately evaporated in a short period of time. In addition, by evaporating the solvent in a short period of time, the occurrence of bleeding can be prevented more appropriately. In this case, the ink is not heated indirectly by heating the medium by a heater, for example, but the ink is heated directly by emitting energy rays, and hence the ink can be heated efficiently and appropriately while the influence on peripheral configurations and the medium is suppressed, for example.

The energy ray emitting unit emits energy rays to polymerize a polymerizable substance in ink such that the viscosity of the ink on a medium is eventually increased to 200 mPa·s (200 mPa·see) or more, for example. In this case, the state of the ink immediately after the energy rays are emitted can be considered in association with a viscosity-increasing required time, which is a time by which the viscosity of ink reaches 200 mPa·sec or more after the emission of energy rays to the ink is started. In this case, the time after the emission of energy rays to the ink is started is, for example, a time after the energy ray emitting unit starts emitting energy rays to ink on each position on the medium. In this case, for example, it is preferred that the viscosity-increasing required time be 100 ms (100 milliseconds) or more.

In this configuration, for example, evaporation-drying ink is used as the ink. In this case, examples of the evaporation-drying ink include ink used such that a solvent in the ink is evaporated to be fixed to a medium. In this case, for example, the ink used in this configuration contains a solvent at 30 wt % or more. More specifically, for example, the proportion of the solvent in the ink may be 70 wt % or more. In this configuration, as the polymerizable substance, a cation-polymerizable monomer or oligomer can be preferably used, for example. With such a configuration, for example, the polymerizable substance can be appropriately selected. Consequently, ink whose viscosity reaches high viscosity over time can be achieved. Such ink may be, for example, UV delay-curable ink, which is ink that is completely cured with a delay from a timing of emitting energy rays.

In this configuration, for example, the ink may further include an energy ray absorbing substance that generates heat by absorbing energy rays. In this case, for example, the energy ray emitting unit emits energy rays to ink adhered to a medium to cause the energy ray absorbing substance to generate heat, thereby causing the ink to generate heat. With such a configuration, for example, the ink can generate heat efficiently and appropriately. In this configuration, as the polymerizable substance, for example, a substance that generates heat during polymerization may be used. In this case, heat generated during polymerization of the polymerizable substance may be used to evaporate the solvent in the ink. More specifically, in this case, the energy ray emitting unit emits energy rays to ink adhered to a medium to polymerize the polymerizable substance, thereby causing the ink to generate heat, for example. Also with such a configuration, ink can generate heat appropriately.

As a configuration of the present disclosure, a printing method having the same features as those described above may be used. In this case, for example, the same effects as those described above can be obtained.

According to the present disclosure, for example, high-quality printing can be performed more appropriately.

BRIEF DESCRIPTION OF THE DRAWINGS

FIGS. 1A and 1B are a top view and a side cross-sectional view simply illustrating an example of a configuration of a main part of the printing apparatus 10.

FIG. 2A illustrates an example of a state in which ink is ejected from an inkjet head 102 in a main scanning operation. FIG. 2B illustrates an example of a state of the medium 50 when heated by an after-heater 24. FIG. 2C illustrates an example of a state of the medium 50 at a time when printing is completed.

FIG. 3A illustrates an example of a state in which ink is ejected from an inkjet head 102 in a main scanning operation. FIG. 3B illustrates an example of a state of the medium 50 when heated by the after-heater 24. FIG. 3C illustrates an example of a state of the medium 50 at a time when printing is completed.

DESCRIPTION OF EMBODIMENTS

Figure 1A:
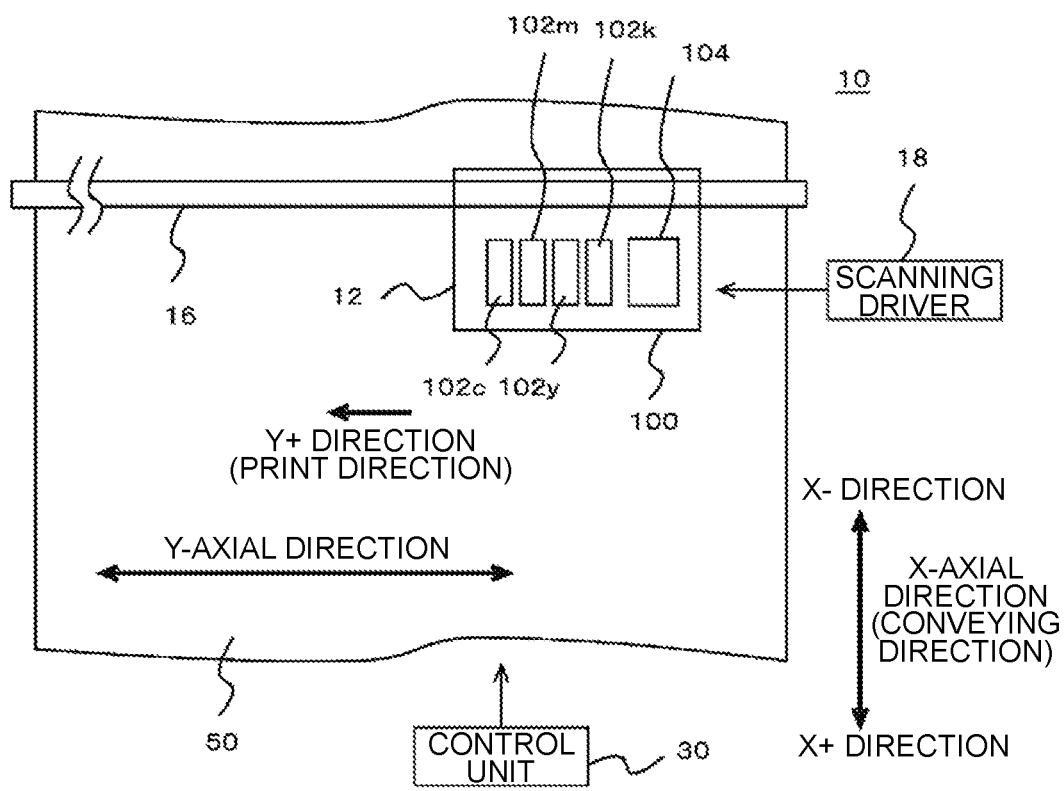
FIGS. 1A to 1B are diagrams illustrating an example of a printing apparatus 10 according to one embodiment of the present disclosure.
Figure 1B:
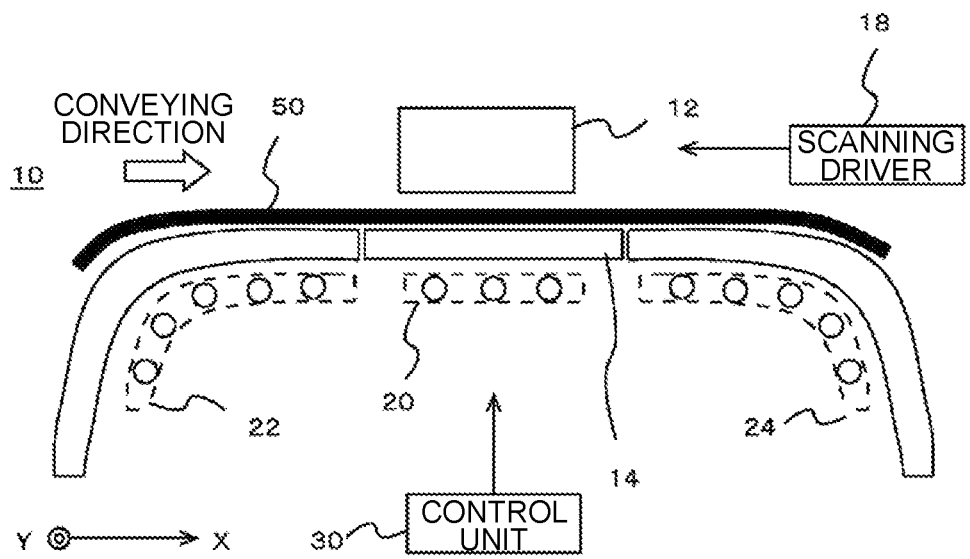

Embodiments according to the present disclosure are described below with reference to the accompanying drawings. FIGS. 1A to 1B illustrate an example of a printing apparatus 10 according to one embodiment of the present disclosure. FIGS. 1A and 1B are a top view and a side cross-sectional view simply illustrating an example of a configuration of a main part of the printing apparatus 10. Except for points described below, the printing apparatus 10 may have the same or similar features as those of publicly known printing apparatuses. For example, the printing apparatus 10 may further have the same or similar various configurations as those of publicly known printing apparatuses in addition to the configurations described below.

In the present example, the printing apparatus 10 is an inkjet printer configured to print by inkjet, and includes a head 12, a platen 14, a guide rail 16, a scanning driver 18, a print heater 20, a pre-heater 22, an after-heater 24, and a control unit 30. The printing apparatus 10 is a serial inkjet printer configured to control the head 12 to perform a main scanning operation. In this case, the main scanning operation is, for example, an operation of ejecting ink (ink droplets) while moving in a main scanning direction (Y-axial direction in the figures) set in advance. Controlling the head 12 to perform a main scanning operation refers to controlling an inkjet head in the head 12 to perform a main scanning operation.

The head 12 is a portion configured to eject ink to a medium 50 to be printed, and includes a carriage 100, a plurality of inkjet heads 102*c* to 102*k*, and a UV light source 104. In this case, the carriage 100 is a holding member configured to hold the inkjet heads 102*c* to 102*k* and the UV light source 104. In the present example, the inkjet heads 102*c* to 102*k* are arranged side by side in the main scanning direction such that positions in a sub scanning direction (X-axial direction in the figures) orthogonal to the main scanning direction are aligned. The inkjet heads 102*c* to 102*k* are inkjet heads configured to eject ink of colors different from one another, and eject ink (color ink) of process colors used for full-color representation. More specifically, the inkjet head 102*c* ejects ink of cyan color (C color). The inkjet head 102*m* ejects ink of magenta color (M color). The inkjet head 102*y* ejects ink of yellow color (Y color). The inkjet head 102*k* ejects ink of black color (K color).

In the present example, each of the inkjet heads 102*c* to 102*k* ejects evaporation-drying ink. Examples of the evaporation-drying ink include ink configured to evaporate a solvent in the ink in order to be fixed to the medium 50. In this case, examples of the solvent include a liquid that dissolves or disperses other components in the ink. The evaporation-drying ink can be considered as, for example, ink containing a solvent at 30 wt % or more. It is more preferred that the content of the solvent in the evaporation-drying ink be 70 wt % or more. In the present example, ink (fast-drying ink) that generates heat when irradiated with energy rays is used as the evaporation-drying ink. Ink generating heat when irradiated with energy rays means, for example, that the ink absorbs the emitted energy rays and the ink itself generates heat. More specifically, in the present example, ultraviolet rays are used as the energy rays.

The ink used in the present example further contains a polymerizable substance that polymerizes when irradiated with ultraviolet rays. The content of the polymerizable substance in the ink is, for example, 10 wt % or more (for example, 10 to 50 wt %), preferably 20 wt % or more. As the polymerizable substance, a substance that polymerizes over a certain period of time after the emission of ultraviolet rays is used. In this case, it takes some time for a viscosity of the ink to reach high levels after the emission of ultraviolet rays is started. The time after the emission of ultraviolet rays to the ink is started is, for example, a time after the UV light source 104 starts emitting ultraviolet rays to the ink at each position on a medium. A timing at which the UV light source 104 starts emitting ultraviolet rays to the ink at each position on the medium is, for example, a timing at which the UV light source 104 moves to emit ultraviolet rays to that position in a main scanning operation. In this case, the ink used in the present example can be considered as, for example, UV delay-curable ink, which is ink that is completely cured with a delay from the timing of the emission of ultraviolet rays.

As the polymerizable substance, for example, a substance that generates heat during polymerization may be used. In this case, heat generated when the polymerizable substance polymerizes may be used to evaporate the solvent in the ink. More specifically, in this case, the UV light source 104 is used to emit ultraviolet rays to the ink adhered to the medium 50 to polymerize the polymerizable substance, thereby causing the ink to generate heat. With such a configuration, for example, the ink can generate heat appropriately. For example, the ink used in the present example may further contain an ultraviolet ray absorbing substance that generates heat by absorbing ultraviolet rays. In this case, the ultraviolet ray absorbing substance is an example of an energy ray absorbing substance. The ultraviolet ray absorbing substance can be considered as, for example, a substance that converts energy of emitted ultraviolet rays into thermal energy. In this case, ultraviolet rays are emitted to the ink adhered to the medium 50 to cause the ultraviolet ray absorbing substance to generate heat, thereby causing the ink to generate heat. With such a configuration, for example, the ink can generate heat more efficiently and appropriately. As such an ultraviolet ray absorbing substance, a publicly known ultraviolet ray absorber can be preferably used. The ultraviolet ray absorbing substance may be a substance that doubles as another additive in the ink. For example, in the case where a substance that sufficiently absorbs ultraviolet rays is used as any component in the ink (for example, colorant, resin, or solvent contained in ink), the component may also function as an ultraviolet ray absorber without adding a dedicated ultraviolet ray absorbing substance.

The ink may have the same or similar features as those of publicly known ink in regard to points other than the above. For example, the ink may further contain the same or similar substance as in publicly known ink in addition to the components described above. More specifically, for example, the ink may contain a polymerization initiator. In this case, examples of the polymerization initiator include a substance that initiates the polymerization of the polymerizable substance in response to the emission of ultraviolet rays. In this case, polymerizing the polymerizable substance through irradiation with ultraviolet rays could mean, for example, polymerizing the polymerizable substance with use of the polymerization initiator. In the case where colored ink other than colorless and transparent clear ink, such as ink of CMYK colors used in the present example, is used, the ink may further contain colorant corresponding to the color of the ink. Features of the ink used in the present example are described in more detail later.

In the head 12 in the present example, the UV light source 104 is energy ray emitting means (energy ray emitting unit) for emitting ultraviolet rays that are an example of energy rays. The UV light source 104 emits ultraviolet rays to the ink adhered to the medium 50 to cause the ink on the medium 50 to generate heat. With such a configuration, for example, the ink can be efficiently and appropriately heated to evaporate at least part of the solvent in the ink. In this case, as the UV light source 104, for example, a UV light source (UV-LED emitting means) using a UVLED is used. With such a configuration, for example, ultraviolet rays in a necessary wavelength range can be appropriately and efficiently emitted. More specifically, in the present example, as illustrated in the figures, the UV light source 104 is disposed such that a position in the sub scanning direction is aligned with those of the inkjet heads 102*c* to 102*k*, at a position behind the inkjet heads 102*c* to 102*k* in the main scanning operation. In this manner, in the main scanning operation, the UV light source 104 emits ultraviolet rays to the ink on the medium 50 immediately after the ink is landed on the medium 50 and before the ink bleeding occurs. The ink itself is caused to generate heat to evaporate at least part of the solvent in the ink, and the viscosity of the ink is increased to a viscosity that causes no bleeding. In this case, causing no bleeding means, for example, that no substantial bleeding occurs for a quality required for printing. According to the present example, for example, an occurrence of the bleeding of ink can be appropriately prevented. In this case, by increasing the viscosity of the ink to a viscosity that causes no bleeding, for example, a coffee stain phenomenon can be appropriately prevented even when pigment is used as colorant. As described above, the ink used in the present example contains a polymerizable substance. In this case, the UV light source 104 emits ultraviolet rays to the ink on the medium 50 to initiate the polymerization of the polymerizable substance. Features in relation to the use of the polymerizable substance are described in more detail later in association with the features of the ink.

The platen 14 is a trapezoidal member configured to support the medium 50, and supports the medium 50 so as to be opposed to the head 12. In the present example, the platen 14 houses the print heater 20, the pre-heater 22, and the after-heater 24 therein. The guide rail 16 is a rail member configured to guide the movement of the head 12 in the main scanning operation.

The scanning driver 18 is a driver configured to control the head 12 to perform a scanning operation of moving relative to the medium 50. In this case, to control the head 12 to perform the scanning operation is, for example, to control the inkjet heads 102c to 102k in the head 12 to perform scanning operations. In the present example, the scanning driver 18 controls the head 12 to perform a main scanning operation and a sub scanning operation as scanning operations. In this case, the scanning driver 18 controls the head 12 to perform the main scanning operation such that the inkjet heads 102c to 102k in the head 12 eject ink to respective positions on the medium 50. By moving the UV light source 104 together with the inkjet heads 102c to 102k in the main scanning operation, the scanning driver 18 controls the UV light source 104 to emit ultraviolet rays to the ink on the medium 50. The scanning driver 18 controls the head 12 to perform the sub scanning operation between an interval of the main scanning operation, thereby sequentially changing the position on the medium 50 opposed to the head 12. In this case, the sub scanning operation is, for example, an operation of moving relative to the medium 50 in the sub scanning direction orthogonal to the main scanning direction. More specifically, in the present example, the scanning driver 18 conveys the medium 50 in a conveying direction parallel to the direction indicated as an X-axial direction in the figures, thereby controlling the head 12 to perform the sub scanning operation. In this case, for example, rollers (not shown) are used to convey the medium 50 in the conveying direction (medium conveying direction) indicated as the X+ direction in the figures.

In the present example, the printing apparatus 10 is a one-way printer configured to perform only a main scanning operation (one-way) in one direction indicated as a Y+ direction (print direction) in the figures. In this case, the Y+ direction is a direction from left to right in FIG. 1A. In the configuration illustrated in FIGS. 1A to 1B, the head 12 ejects color ink of CMYK colors as described above. In this case, in each main scanning operation, ultraviolet rays can be emitted to ink immediately after the ink is landed on the medium 50, thereby suppressing the occurrence of bleeding to perform high-definition printing appropriately. In a modification of the configuration of the head 12, for example, clear ink may further be used. In this case, the clear ink is, for example, ink that contains no colorant. In this case, for example, when an overcoat layer is formed, it may be preferred to dry the ink not immediately after the ink is landed but after the ink is planarized with a lapse of a certain period of time. In this case, for example, the ink may be ejected in a main scanning operation for its outward path in which the head 12 is moved in the Y+ direction, and ultraviolet rays may be emitted when the head 12 is moved in its return path in which the head 12 is returned to its original position. In this case, the main scanning operation for the return path in the one-way printer is, for example, an operation of moving the head 12 without ejecting ink. With such a configuration, for example, a time interval can be provided until the emission of ultraviolet rays to planarize the ink appropriately.

The print heater 20, the pre-heater 22, and the after-heater 24 are heating means for heating the medium 50. Of these, the print heater 20 is a heater configured to heat the medium 50 at a position opposed to the head 12. By using the print heater 20, for example, the ink on the medium 50 can be more efficiently heated. In this case, the configuration of the printing apparatus 10 in the present example can be considered as a configuration for drying the ink by using the UV light source 104 and the print heater 20 in combination.

If a heating temperature in the print heater 20 is high, for example, when the inkjet head in the head 12 is heated, a problem of nozzle clogging is likely to occur. In this case, the nozzle clogging is, for example, a clogging of a nozzle of the inkjet head caused by dried ink. Thus, it is preferred that the heating temperature by the print heater 20 be 70° C. or lower. In the present example, as described above, the ink can be efficiently heated by using the UV light source 104. Thus, it is more preferred that the heating temperature by the print heater 20 be sufficiently low for the purpose of suppressing the influence of environment temperature and making the temperature of the medium 50 constant. Also in this case, the print heater 20 can be used to obtain appropriately constant evaporation conditions of the solvent in the ink. More specifically, for example, the print heater 20 heats a region opposed to the print heater 20 at a temperature (for example, about 50° C. or lower) closer to room temperature. A heating temperature of the medium 50 by the print heater 20 is preferably 40° C. or lower, more preferably 35° C. or lower. With such a configuration, for example, the influence of environment temperature can be appropriately suppressed while the problem of nozzle clogging is suppressed.

The pre-heater 22 is a heater configured to heat (preliminarily heat) the medium 50 on an upstream side of the head 12 in the conveying direction. By using the pre-heater 22, for example, an initial temperature of the medium 50 can be appropriately adjusted before the medium 50 reaches the position of the head 12. In this case, it is also preferred that the heating temperature of the medium 50 by the pre-heater 22 be, for example, a substantially low temperature (for example, 50° C. or lower, preferably 40° C. or lower, more preferably 35° C. or lower) for the purpose of suppressing the influence of environment temperature. The after-heater 24 is a heater configured to heat the medium 50 on a downstream side of the head 12 in the conveying direction. By using the after-heater 24, for example, the ink can be more reliably dried before printing is completed. For example, the heating temperature of the medium 50 by the after-heater 24 may be about 30 to 50° C. The after-heater 24 can be considered as, for example, a heater for post-heating (post-drying means) configured to completely remove solvent components that remain when the medium 50 is heated by the print heater 20. The heating temperature of the after-heater 24 may be set to a certain degree of high temperature, in the range that does not go beyond a heat-proof temperature of the medium 50 in use.

As described above, in the present example, the UV light source 104 is used to evaporate at least part of the solvent in the ink. In this case, the anti-bleeding and the drying of ink layers can be implemented mainly by the emission of ultraviolet rays from the UV light source 104. Thus, a part or all of the print heater 20, the pre-heater 22, and the after-heater 24 may be omitted depending on the environment where the printing apparatus 10 is used and the required printing quality. As the print heater 20, the pre-heater 22, and the after-heater 24, publicly known various heating means may be used. More specifically, for example, various kinds of heaters and warm air heaters (for example, a heat transfer heater, a warn air heater, and an infrared heater) can be used as the print heater 20, the pre-heater 22, and the after-heater 24. As the after-heater 24, for example, a UV light source (UV post-emitting means) may be used.

The control unit 30 is, for example, a CPU in the printing apparatus 10, and controls operation of the units in the printing apparatus 10. For example, in each main scanning operation, the control unit 30 controls the inkjet heads 102c to 102k to eject ink at timings set in accordance with an image to be printed, thereby controlling the inkjet heads 102c to 102k to render the image. According to the present example, for example, desired images can be appropriately printed by the printing apparatus 10.

Subsequently, the features of the ink used in the present example are described in detail. As described above, in the present example, printing is performed by the configuration in which ultraviolet rays are emitted from the UV light source 104 using a UVLED to dry the ink instantaneously (UVLED fast-drying method). In this case, for example, unlike the case where a medium is heated by a heater to heat the ink indirectly, ultraviolet rays are emitted to heat the ink directly, and hence the ink can be heated efficiently and appropriately by suppressing the influence on peripheral configurations and the medium 50. Thus, in the present example, for example, the ink can be heated to a temperature higher than in the case where ink is heated by using only a heater.

More specifically, in the present example, the UV light source 104 emits ultraviolet rays to the ink adhered to the medium 50, thereby causing the ink to generate heat to a temperature at which the solvent in the ink boils. The solvent in the ink boils means, for example, that the temperature of the solvent reaches a boiling point in at least part of a period before the ink is fixed to the medium 50. With such a configuration, for example, the ink can be appropriately heated to high temperature. Consequently, at least part of the solvent in the ink can be appropriately evaporated in a short period of time. Furthermore, the occurrence of bleeding can be appropriately prevented because the solvent is evaporated in a short period of time. In this case, however, the ink on the medium 50 may cause an explosive boiling phenomenon when irradiated with intense ultraviolet rays. In this case, if only the fast-drying method is simply used, a surface of the ink may become coarse to make it difficult to perform high-glossy printing.

In the present example, on the other hand, as described above, ink containing a polymerizable substance that polymerizes when irradiated with ultraviolet rays is used. As the polymerizable substance, a substance that polymerizes over a certain period of time after the emission of ultraviolet rays is used. With such a configuration, for example, by emitting ultraviolet rays to the ink on the medium 50, the ink can generate heat and further the polymerizable substance can be polymerized. In this case, for example, the polymerizable substance is cured due to polymerization and functions as a binder resin of the ink. In this case, by using the polymerizable substance that polymerizes over time, the binder resin can be planarized appropriately and sufficiently before the viscosity of the ink is further increased due to the polymerization of the polymerizable substance. In this case, for example, even when the surface of the ink becomes temporarily coarse as a result of being matte or porous due to the fact that the solvent is instantaneously evaporated by the emission of ultraviolet rays, the surface of the ink can be thereafter planarized (smoothed) appropriately. In this case, to planarize the surface of the ink is, for example, to planarize dots of the ink. To planarize the surface of the ink can be considered as, for example, to planarize ink layers formed by a large number of ink dots. According to the present example, for example, high-quality printing can be performed more appropriately in the case of using fast-drying ink.

More specifically, in the present example, for example, the UV light source 104 emits ultraviolet rays to polymerize the polymerizable substance in the ink such that the viscosity of the ink on the medium 50 is eventually increased to 200 mPa·sec or more. It is more preferred that the viscosity of the ink be 10,000 mPa·sec or more upon the completion of the polymerization of the polymerizable substance. In this case, by using the polymerizable substance that polymerizes over time, a viscosity-increasing required time, which is a time until a curing of the ink sufficiently progresses, is set to 100 ms or more. In this case, the viscosity-increasing required time can be considered as, for example, a time from when the emission of ultraviolet rays to the ink on the medium 50 is started to when the viscosity of the ink reaches 200 mPa·sec or more. The viscosity-increasing required time can also be considered as, for example, a delay time from when the emission of ultraviolet rays is started to when the curing sufficiently progresses (delay-curing time of delay-curable resin after emission of UV).

In this case, the ink on the medium 50 can be considered as, for example, a configuration in which the planarization of the ink progresses with lapse of time at a time after 100 ms has elapsed since the ultraviolet rays were emitted by the UV light source. The state in which the planarization progresses with lapse of time is, for example, a state in which the state of the surface of the ink changes with lapse of time and the surface of the ink becomes flatter. In this case, for example, this state can also be considered as a state in which a gloss changes to be higher with lapse of time in regard to the quality of a printed image. In this case, the state in which the gloss changes to be higher is, for example, a state in which the gloss changes to be higher substantially in an impression observed with human eyes.

Subsequently, the composition of the ink used in the present example is described in more detail. As described above, in the present example, as the ink, for example, ink containing a polymerizable substance, an ultraviolet ray absorber, and a solvent may be used. In the case of using colored ink other than clear ink, the ink further contains colorant (such as pigment) corresponding to the color of the ink. In this case, as the polymerizable substance, for example, a monomer or an oligomer (UV delay-curable binder resin) that serves as a binder resin whose polymerization (curing) is completed with a delay from the timing of starting the emission of ultraviolet rays is used rather than a substance whose polymerization is completed immediately after ultraviolet rays are emitted. In this case, a cation-polymerizable monomer or oligomer can be preferably used.

With such a configuration, for example, the polymerizable substance having the above-mentioned features can be appropriately selected. More specifically, as the polymerizable substance, for example, an epoxy-based, a vinyl ether-based, or an oxetane-based cation-polymerizable monomer or oligomer may be used.

In this case, the viscosity-increasing required time for the polymerizable substance serving as a UV delay-curable binder resin may be, for example, longer than a time necessary for the ink to be appropriately planarized. The time necessary for the ink to be appropriately planarized is, for example, a time necessary for a UV delay-curable binder resin to be appropriately and sufficiently planarized in a situation where the solvent in the ink has been evaporated by being irradiated with ultraviolet rays. In this case, the viscosity-increasing required time can be considered as, for example, a time necessary for the ink to become a high viscosity state of 200 mPa·sec or more such that fluidity and bleeding are eliminated from a low state viscosity of about 100 mPa·sec or less. In this case, in order to set the viscosity-increasing required time to be longer than the time necessary for the ink to be appropriately planarized, it is preferred to set the viscosity-increasing required time be 100 ms or more as described above. With such a configuration, for example, even when the surface of the ink becomes temporarily coarse as a result of being matte or porous, the ink can be thereafter planarized appropriately. Consequently, for example, high-glossy printing can be appropriately performed by preventing an image from being matte.

In view of preventing an image from being matte, it is conceivable that a longer viscosity-increasing required time is preferred. However, in the actual configuration of the printing apparatus 10, another adverse effect may occur if the viscosity-increasing required time is too long. More specifically, for example, if the viscosity-increasing required time is increased to exceed 100 s (100 seconds), contamination may occur due to uncured ink in the conveyance path (traveling system) of the medium 50 and in the configuration of rolling up the medium 50 after printing. Thus, for example, it is preferred to set the viscosity-increasing required time be 100 ms or more and 100 s or less. A lower limit of the viscosity-increasing required time is more preferably 500 ms or more. An upper limit of the viscosity-increasing required time is more preferably 10 s or less. The time necessary for the ink to be planarized and the viscosity-increasing required time generally change depending on the temperature of the ink and the medium 50. Thus, for example, these times may be adjusted by changing the heating temperature by the after-heater 24. More specifically, for example, in the after-heater 24, by heating the medium 50 at a temperature of 50° C. or higher within the range where the ink or the medium 50 is not burnt or deformed, for example, the planarization of the ink may be promoted, and the viscosity-increasing required time may be reduced.

The ink in the present example contains one or more kinds (single or a plurality of kinds) of ultraviolet ray absorbers. In this case, for example, the ultraviolet ray absorber is added into the ink by being contained in one or both of a solvent and a binder resin (UV delay-curable binder resin). When a plurality of kinds of ultraviolet ray absorbers are used, a plurality of kinds of ultraviolet ray absorbers having different main functions may be used. More specifically, in this case, for example, an ultraviolet ray absorber (hereinafter referred to as "absorber A") used mainly for causing the ink to generate heat and an ultraviolet ray absorber (hereinafter referred to as "polymerization initiator B") used mainly for polymerizing the polymerizable substance may be used. For example, the absorber A and the polymerization initiator B may be added to the ink by being contained in the solvent or other compositions in the ink.

In this case, as the absorber A, for example, it is preferred to use a substance (material) that effectively absorbs ultraviolet rays emitted from the UV light source 104 in order to dry the ink instantaneously. As such a substance, for example, a substance whose absorption wavelength overlaps with an emission wavelength range (UV emission wavelength range) of ultraviolet rays from the UV light source 104 and in which 30% or more (preferably, 50% or more) of energy of absorbed ultraviolet rays is converted into thermal energy can be preferably used. As the polymerization initiator B, a publicly known polymerization initiator can be preferably used depending on a polymerizable substance to be used. More specifically, as the polymerizable substance, for example, an epoxy-based, an vinyl ether-based, or an oxetane-based cation-polymerizable monomer may be used. In this case, as the polymerization initiator B, a publicly known initiator (or sensitizer) for causing the substance to perform cation polymerization can be preferably used. As such a polymerization initiator B, for example, a diazonium salt, a fenocenium salt, a sulfonium salt, or an iodonium salt initiator, which is an ionic cationic polymerization initiator, may be used. As the polymerization initiator B, for example, a photo-acid-generating agent of an imide sulfonate derivative, which is a non-ionic cationic polymerization initiator, may be used. The configuration in which the absorber A and the polymerization initiator B are used as described above can be considered as, for example, a configuration in which the absorber A is mainly used to exchange heat for evaporating the solvent in the ink while the polymerization initiator B mainly serves to turn the polymerizable substance into a polymer resin due to cationic polymerization UV curing reaction.

As the solvent of the ink, for example, one or both of water and an organic solvent may be used. In this case, for example, a monomer compatible with the polymerizable substance may be used as at least part of the solvent. More specifically, as the solvent, for example, a solvent that is evaporated when heated, such as glycidyl ether-based material such as 2-ethylhexyl glycidyl ether and higher alcohol-based butyl glycidyl ether, methyl ethyl ketone, ethylene glycol monomethyl ether, and dimethylformamide, may be used. These solvents may be used as part of the solvent. In this case, it is preferred that the solvent be evaporated when heated be 15% by volume or more and 85% by volume or less of the whole volume of the ink.

In the case where such a solvent is used, the ink used in the present example can be considered as ink having a configuration similar to solvent UV ink (SUV ink), which is a UV curable ink (UV ink) diluted with a solvent. However, the configuration in the present example has features greatly different from those of the configuration in which conventional solvent UV ink is used in that, as described above, the polymerizable substance that polymerizes over a certain period of time after the emission of ultraviolet rays is used and the ink is heated by the fast-drying method. In this case, the ink used in the present example may be, for example, delay-curable SUV ink.

As colorant of the ink, for example, publicly known pigment or dye can be preferably used. For example, the colorant may be dispersed or dissolved in a solvent. The colorant may be dissolved or dispersed in a component (for example, a polymerizable substance) other than the solvent. More specifically, for example, the colorant may be dispersed or dissolved in a cation-polymerizable monomer or oligomer or a glycidyl ether-based material.

Subsequently, in regard to the configuration in which printing is performed by the fast-drying method, the matters related to the features of using the ink containing the polymerizable substance as described above are described in more detail. First, for the sake of description, the case where printing is performed by the fast-drying method by using conventional ink is described.

Figure 2A:
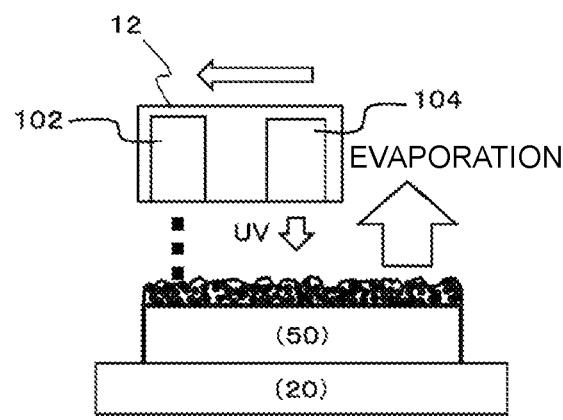
FIGS. 2A to 2C are diagrams for describing how to fix ink to a medium 50 (fixation model) in the case where printing is performed by a fast-drying method using conventional ink.
Figure 2B:
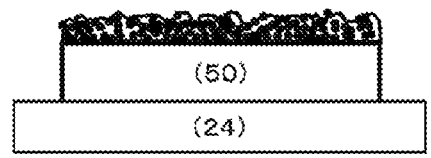
Figure 2C:
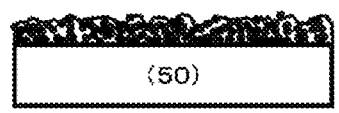

FIGS. 2A to 2C are diagrams for describing how the ink is fixed to the medium 50 (fixation model) in the case where printing is performed by the fast-drying method using conventional ink. FIG. 2A illustrates an example of a state in which the ink is ejected from the inkjet head 102 in a main scanning operation. FIG. 2B illustrates an example of a state in which the ink is heated by the after-heater 24. FIG. 2C illustrates an example of a state of the medium 50 upon the completion of printing.

In this case, in the main scanning operation, for example, as illustrated in FIG. 2A, immediately after the ink ejected from the inkjet head 102 for color ink has been landed on the medium 50 (immediately after color printing), ultraviolet rays are emitted from the UV light source 104 to cause the ink to generate heat. In this manner, for example, the temperature of the ink is increased to a temperature higher than the heating temperature by the print heater 20, and the solvent in the ink is rapidly evaporated. With such a configuration, for example, the viscosity of the ink can be increased appropriately before the ink bleeding occurs. In this case, however, as described above, the surface of the ink may become coarse due to the instantaneous evaporation of the solvent. In the case where printing is performed by the fast-drying method by using conventional ink, the state of the surface of the ink is substantially fixed at this time point. As a result, the surface of the ink is solidified while being coarse (coarsened and solidified). In this case, for example, the coffee stain phenomenon may occur.

In this case, for example, as illustrated in FIG. 2B, when the ink is heated by the after-heater 24 to evaporate solvent components in the ink completely, the ink is fixed to the medium 50 while the surface remains coarse (completely cured and fixed). As a result, the state of the medium 50 upon the completion of printing becomes, for example, a state in which the surface remains coarse as illustrated in FIG. 2C. As described above, in the case where printing is performed by the fast-drying method by using conventional ink, the surface of the ink easily becomes coarse in final print results, and it may be difficult to perform high-glossy printing (glossy print).

Figure 3A:
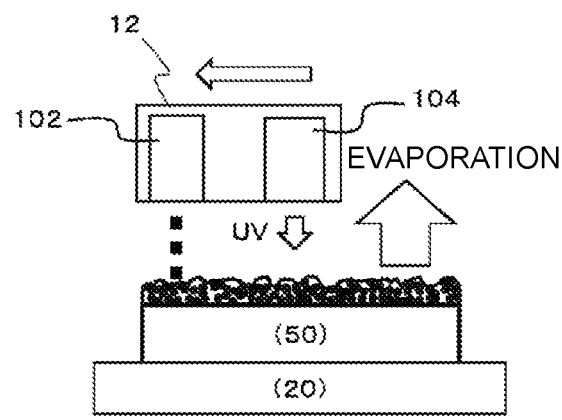
FIGS. 3A to 3C are diagrams for describing how to fix ink to a medium 50 in the case where printing is performed by a fast-drying method using ink in the present example.
Figure 3B:
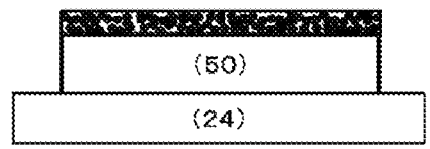
Figure 3C:
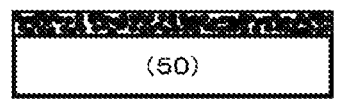

In the present example, on the other hand, as described above, printing is performed by the fast-drying method by using ink (such as delay-curable SUV ink) containing a polymerizable substance that functions as a UV delay-curable binder resin, and hence high-glossy printing can be performed more appropriately. FIGS. 3A to 3C are diagrams for describing how the ink is fixed to the medium 50 in the case where printing is performed by the fast-drying method by using the ink in the present example. FIG. 3A illustrates an example of a state in which the ink is ejected from the inkjet head 102 in a main scanning operation. FIG. 3B illustrates an example of a state in which the ink is heated by the after-heater 24. FIG. 3C illustrates an example of a state of the medium 50 upon the completion of printing.

Also in this case, in the main scanning operation, for example, as illustrated in FIG. 3A, ultraviolet rays are emitted from the UV light source 104 immediately after the ink is landed on the medium 50, thereby causing the ink to generate heat. In this manner, for example, the temperature of the ink is increased to a temperature higher than the heating temperature by the print heater 20, and the solvent in the ink is rapidly evaporated. More specifically, in this case, for example, it is preferred to emit intense ultraviolet rays of about 0.1 to 5 J/cm$^2$. With such a configuration, for example, the ink can be heated more appropriately with the fast-drying method.

In the case where the ink in the present example is used, immediately after ultraviolet rays are emitted, the polymerization of the polymerizable substance (curing of UV delay-curable binder resin) has not progressed. As a result, the ink on the medium 50 is maintained to have low viscosity (for example, liquid state). Specifically, in the case where the ink in the present example is used, even when a most part of the solvent in the ink has been evaporated by the fast-drying method, the ink maintains a soft state with low viscosity within a delay time until the curing progresses owing to the features of delay curing by which it takes a longer time for the curing of the ink to progress to increase the viscosity of the ink. As a result, even after the solvent is evaporated, the planarization of the ink progresses.

In this case, even when the surface of the ink becomes coarse immediately after ultraviolet rays are emitted, for example, the surface of the ink can be appropriately planarized as long as the ink can be maintained to have low viscosity for 100 ms or more after the ultraviolet rays are emitted to the ink. In the case of performing more high-glossy printing, it is preferred to increase the time until the viscosity of the ink becomes high. More specifically, it is considered that the ink on the medium 50 is planarized at a speed determined depending on a surface tension and the viscosity of the ink. It is generally considered that the planarization of ink used for inkjet progresses more appropriately and sufficiently after the ink is left for about 500 ms (0.5 seconds), for example, when the viscosity is about 20 mPa·sec. Thus, for example, it is more preferred that the viscosity-increasing required time described above be 500 ms or more. It is more preferred that the viscosity-increasing required time be 1 s (1 second) or more.

In this case, for example, as illustrated in FIG. 3B, the ink has been planarized at a time when the ink is heated by the after-heater 24. At this time point, the curing of the ink has been sufficiently promoted. Thus, according to the present example, for example, the ink is fixed to the medium 50 in the state in which the ink is appropriately and sufficiently planarized. As a result, the state of the medium 50 upon the completion of printing becomes, for example, as illustrated in FIG. 3C, the state in which the surface is sufficiently planarized and has high gloss. In this manner, according to the present example, for example, the surface of the ink can be appropriately prevented from coarsening even when printing is performed by the fast-drying method. Consequently, for example, printing by the fast-drying method can be performed more appropriately in use applications where high gloss is required. In this case, by performing printing by the fast-drying method to prevent bleeding, for example, the printing can be performed appropriately at high speed even when an amount of ink ejected per unit area is large. Thus, the printing can be performed more appropriately even in use applications where printing is required to be performed with high gloss and high density, such as use applications where printing is performed on printing book paper, labels, or packages.

Subsequently, supplemental description on the configurations described above and description on modifications are given. As described above, a cation-polymerizable polymerizable substance (cation-curable resin) can be preferably used as a polymerizable substance (UV delay-curable binder resin, photo-curable resin) for the ink in the present example. However, for example, a polymerizable substance serving as a radical-polymerizable or an anionic-polymerizable resin may be used as long as the substance can be cured with a delay corresponding to the purpose described above. In this case, for example, in regard to the ultraviolet ray absorber and the polymerization initiator described above as the absorber A and the polymerization initiator B, it is preferred to use substances selected depending on the polymerizable substance to be used.

For example, the solvent of the ink may be selected depending on the drying speed of the ink and the polymerizable substance to be used. More specifically, delay-curable type SUV ink (delay-curable SUV ink) has been described above as a specific example of the ink used in the present example. In this case, as the solvent, a solvent (organic solvent) may be used. However, for example, an aqueous solvent such as water may be used as the solvent of the ink. In this case, as the polymerizable substance, a soluble substance may be used. With such a configuration, for example, safer ink can be provided. The viscosity of the ink may be changed, for example, depending on the configuration of an inkjet head in use (for example, the type of inkjet head). In this case, the principle that the inkjet head ejects ink is not particularly limited, and various publicly known inkjet heads may be used.

The viscosity of the ink on the medium can be considered as, for example, viscosity to be measured by performing printing with a pattern set in advance. In this case, a measurement of the viscosity of the ink after ultraviolet rays are emitted is not limited to the case where the viscosity is actually measured, and, for example, the viscosity may be calculated based on components of the ink. In relation to the viscosity of the ink, the viscosity-increasing required time described above can be considered as, for example, a time during which the viscosity of the ink is regarded as smaller than 200 mPa·sec. In this case, the state in which the viscosity of the ink is regarded as smaller than 200 mPa·sec is, for example, a state in which the planarization of the ink progresses with lapse of time of about 100 ms. The state in which the viscosity-increasing required time is 100 ms or more may be, for example, a state in which the time during which the viscosity of the ink is regarded as smaller than 200 mPa·sec is 100 ms or more.

For example, the color of ink to be used is not limited to the case where CMYK colors are used, such as the configuration illustrated in FIGS. 1A to 1B, and can be variously modified. More specifically, for example, ink of RGB colors may be used in addition to the CMYK colors that are basic colors. Ink of white, pearl colors, fluorescent colors, or other particular colors such as metallic colors and clear colors may be used. In this case, the color of the ink and the number of colors are not limited to a particular color and a particular number of colors as long as the number of colors is one or more. As the ink, for example, ink of a light color (light ink) for increasing gradation performance may be used.

The specific configuration of the head 12 (see FIGS. 1A to 1B) can be variously modified. For example, a number of rows by which the inkjet heads are arranged side by side in the main scanning direction is not limited to the case of one row as illustrated in FIG. 1A, and may be increased to a plurality of rows (multiple arrangement). To increase a printing speed or increase a width of a printing range, the inkjet heads may be arranged in a staggered pattern. The medium 50 to be used is not limited as long as the medium 50 can be printed by inkjet. More specifically, as the medium 50, for example, various media 50 such as plastic films, cloth, wood, leather, ceramics, glass, metal, and paper can be used.

In regard to more specific printing methods, various configurations can be used. For example, a number of passes for printing (number of print passes for scanning) is not particularly limited, and printing may be performed by a single pass or a plurality of passes (multi-pass). The specific use of the printing apparatus 10 is not limited to a particular use, and various wide uses are possible. For example, the printing apparatus 10 may be used as a sign graphics printer or a textile printer. The printing apparatus 10 may be used as various kinds of industrial printers, 3D printers, or a coater for various kinds of solutions. The case where ultraviolet rays are used as energy rays to be emitted by a fast-drying method has been mainly described above. For example, infrared rays may be used as energy rays in configurations of a monochrome printer or a multi-color printer of several colors, which allow ink coloring.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

INDUSTRIAL APPLICABILITY

The present disclosure can be preferably used for, for example, a printing apparatus.

What is claimed is:
1. A printing apparatus configured to print on a medium by inkjet, comprising:
 an inkjet head, configured to eject ink to the medium; and
 an energy ray emitting unit, configured to emit energy rays to the ink adhered to the medium, wherein
 the energy ray emitting unit emits the energy rays to the ink adhered to the medium to cause the ink to generate heat to evaporate at least a part of a solvent in the ink,
 the ink ejected by the inkjet head includes a polymerizing substance that polymerizes when irradiated with the energy rays, and the solvent, and
 the ink adhered to the medium is in a state in which planarization of the ink progresses with a lapse of time at a time point after 100 ms has elapsed since the energy ray emitting unit emitted the energy rays.
2. The printing apparatus according to claim 1, wherein the energy ray emitting unit emits energy rays to the ink adhered to the medium, thereby causing the ink to generate heat to a temperature at which the solvent in the ink boils.
3. The printing apparatus according to claim 2, wherein the energy ray emitting unit emits energy rays to the ink adhered to the medium to polymerize the polymerizing substance in the ink such that a viscosity of the ink on the medium increases to 200 mPa sec or more, and
 when a time taken for the viscosity of the ink to become 200 mPa·sec or more from when the emission of energy rays to the ink is started is defined as a viscosity-increasing required time, the viscosity-increasing required time is 100 ms or more.
4. The printing apparatus according to claim 1, wherein the energy ray emitting unit emits energy rays to the ink adhered to the medium to polymerize the polymerizing substance in the ink such that a viscosity of the ink on the medium increases to 200 mPa·sec or more, and when a time taken for the viscosity of the ink to become 200 mPa·sec or more from when the emission of energy rays to the ink is started is defined as a viscosity-increasing required time, the viscosity-increasing required time is 100 ms or more.

5. The printing apparatus according to claim 4, wherein the ink further includes an energy ray absorbing substance, configured to generate heat by absorbing energy rays, and the energy ray emitting unit emits the energy rays to the ink adhered to the medium to cause the energy ray absorbing substance to generate heat, thereby causing the ink to generate heat.

6. The printing apparatus according to claim 1, wherein the ink further includes an energy ray absorbing substance, configured to generate heat by absorbing energy rays, and the energy ray emitting unit emits the energy rays to the ink adhered to the medium to cause the energy ray absorbing substance to generate heat, thereby causing the ink to generate heat.

7. The printing apparatus according to claim 2, wherein the ink further includes an energy ray absorbing substance, configured to generate heat by absorbing energy rays, and the energy ray emitting unit emits the energy rays to the ink adhered to the medium to cause the energy ray absorbing substance to generate heat, thereby causing the ink to generate heat.

8. The printing apparatus according to claim 3, wherein the ink further includes an energy ray absorbing substance, configured to generate heat by absorbing energy rays, and the energy ray emitting unit emits the energy rays to the ink adhered to the medium to cause the energy ray absorbing substance to generate heat, thereby causing the ink to generate heat.

9. The printing apparatus according to claim 1, wherein the polymerizing substance is a substance that generates heat during polymerization, and the energy ray emitting unit emits energy rays to the ink adhered to the medium to polymerize the polymerizing substance, causing the ink to generate heat.

10. The printing apparatus according to claim 1, wherein the polymerizing substance is a substance that polymerizes when irradiated with ultraviolet rays, and the energy ray emitting unit emits ultraviolet rays as energy rays.

11. The printing apparatus according to claim 1, wherein the polymerizing substance is a cation-polymerizable monomer or oligomer.

12. The printing apparatus according to claim 1, wherein the ink contains the solvent at 30 wt % or more.

13. A printing method for printing on a medium by inkjet, comprising:

using an inkjet head configured to eject ink to the medium and an energy ray emitting unit configured to emit energy rays to the ink adhered to the medium; and emitting, by the energy ray emitting unit, the energy rays to the ink adhered to the medium, causing the ink to generate heat to evaporate at least a part of a solvent in the ink, wherein the ink ejected by the inkjet head includes a polymerizing substance that polymerizes when irradiated with the energy rays, and the solvent, and the ink adhered to the medium is in a state in which planarization of the ink progresses with a lapse of time at a time point after 100 ms has elapsed since the energy ray emitting unit emitted the energy rays.

* * * * *